United States Patent Office 2,719,118
Patented Sept. 27, 1955

2,719,118

TREATMENT OF EFFLUENTS

John J. Bernard, Philadelphia, Pa., and William Wald, Palmyra, N. J., assignors to Rohm & Haas Company, Philadelphia, Pa., a corporation of Delaware No Drawing. Application February 14, 1952, Serial No. 271,652

10 Claims. (Cl. 210—2)

This invention deals with a method for treating aqueous waste liquors or solutions containing solids and/or liquids dispersed therein in the presence of a non-ionic detergent. This invention concerns the steps which may be taken to rid an effluent of solids or liquids which are suspended therein with the aid of a non-ionic detergent, wetting agent, or emulsifier, said steps including adjusting the pH of such effluent, if necessary, to the acid side, adding a tannin thereto, permitting the suspended materials to collect or flocculate, and separating the flocculated materials and aqueous medium.

With extending usage of non-ionic detergents or wetting agents there has arisen a problem in properly disposing of effluents from many of the processes in which these are used. The dumping of such effluents into streams may create serious problems, for the effluents have a high biological oxygen demand. Many of the effluents are putrescible and cannot be disposed of in pools or lagoons without becoming obnoxious. The effluents are usually objected to if added to ordinary sewage. It has thus become highly desirable to provide a convenient and eonomical method for treating and disposing of effluents containing non-ionic detergents particularly when they help carry suspended matter in aqueous effluents.

Non-ionic detergents have become widely used in recent years. They are composed of a hydrophobic portion which contains a large hydrocarbon group and a hydrophilic portion which depends for its activity upon ether linkages and the hydroxyl group. Thus in the molecule of a non-ionic agent there is no highly active chemical group, such as the carboxyl group of ordinary, fatty acid soaps, which can be readily reacted. Since non-ionic agents are effective in both alkaline and acidic media, they cannot be disposed of through mere change in pH. In some cases, however, the activity of non-ionic agents can be overcome by resort to high temperatures. But this method is not an economical one.

Non-ionic agents may be prepared by addition of ethylene oxide or its equivalent to long-chained carboxylic acids, alcohols, mercaptans, or amines. Alkylphenols provide a particularly useful class of agents through addition of ethylene oxide. The products resulting from the addition have the general form $RX(C_nH_{2n}O)_yH$, where R is a hydrocarbon group, X is a polar linkage such as oxygen, sulfur, nitrogen, carboxyl, or the like, $C_nH_{2n}$ is a small alkylene chain, usually ethylene, and y is an integer, being of sufficient size to ensure water-solubility of the product. Typical examples of RX include the group obtained from an octylphenol or nonylphenol, R'phenylO—, or the group from dodecyl mercaptan, R'S—, or the group from hexadecylamine, R'NH, or the group from fatty acids, such as oleic, stearic, or the like, including mixtures of products as in tall oil, or the group from a long-chained alcohol such as lauryl alcohol, etc.

Illustrative examples of effluents which may desirably be processed according to this invention are waste wash waters from launderies containing a non-ionic detergent, builder, and suspended soil or dirt; wool scouring wastes containing sodium carbonate, sodium bicarbonate, sodium soaps of fatty acids removed from the washed wool, non-ionic agent, emulsified grease, and filth of many kinds; discarded baths used for cleaning metals, containing in addition to alkali cleaners and non-ionic detergents inorganic and organic dirt, oil, and grease; kier-boiling liquids containing caustic, non-ionic detergent or penetrant, dispersed waxes, pectins, and dirt; waste liquors from degreasing hides or skins containing emulsified natural greases usually together with solvent; and like waste effluents.

To cause the separation of suspended matter and aqueous solution the effluent is treated with a tannin on the acid side, the tannin is distributed through the volume of effluent to be treated, and the suspended matter is allowed to separate or form a distinct phase. The separation occurs most expeditiously when the effluent is at least warm. Since most of the effluents are obtained from processes where they have been heated, it in desirable to treat them at once or while they are still at a temperature above about 35° C. The temperature of the effluent may be as high as 100° C.

If the effluent is already acidic, the tannin may be added directly. If the effluent is alkaline, sufficient acid should be added to bring the pH to the acid side. The process works best with the pH between 6 and 3. More extreme acidity merely causes greater consumption of acid and, if the final effluent is to be about neutral, also will require additional amounts of an alkaline agent. Any strong acid, such as sulfuric or hydrochloric, is conveniently used. Where waste acid liquors, as from pickling or carbonizing are available, they may desirably be disposed of by using them to acidify waste alkaline liquors and vice versa. The acidic liquor treated with a tannin is desirably mixed by stirring or by agitating as with a stream of air or, if it is desired to warm up the effluent, with steam.

Separation is then accomplished in a convenient manner, as by settling in a tank, basin, or lagoon. If oil or grease forms on the surface, it is taken off. The clear liquor is run off and, if required, is further treated, as with lime, soda ash, or caustic to remove acidity, or with chlorine, if necessary. The water layer may then be run to a sewer or to a stream.

Examples of treating effluents according to this invention follow.

*Example 1*

A scouring bath is prepared containing 85 pounds of soda ash and 1.7 pounds of isooctylphenoxypolyethoxyethanol in 1000 gallons of water. The bath is heated to 130° F. and wool in the raw is entered. The dirt and grease are largely removed therefrom in this first bath and left therein as the wool passes on to a second scouring bowl. When dirt and grease have been built up in the bath, the bath liquors are drawn off and sent to the recovery unit.

Here sulfuric acid is added until the liquors have a pH of 3.2. There is then added tannic acid to the extent of 0.02% of the bath liquors. The bath is blown with air to cause mixing and the liquors are then left standing. In about 15 minutes an oil layer forms. This is run off to a wool grease recovery system. The liquor with sediment is run into a lagoon where the sediment is allowed to settle out. To this same lagoon there are also fed slightly alkaline liquors from other processes. Clear, liquor overflows to a stream.

*Example 2*

The liquor in the second scouring bowl contains about 0.1% of soda ash, mostly obtained by carry over from the first with its stronger liquor. But to this bowl there has been added isooctylphenoxypolyethoxyethanol until this bath contains 0.1% of it. Grease builds up in this bath until about 5% of grease is present therein. The liquor from this bowl is passed while still at 120°–130° F. to the recovery system. Dilute sulfuric acid is added until the pH is adjusted to about 3.2. A solution of tannic acid is then slowly added until there is no further precipitation. The bath is maintained at about 120° for an hour, during which time a layer of grease forms and is taken off. The aqueous layer is neutralized with milk of lime and run into a settling basin, from which clear liquor overflows into a stream.

In place of tannic acid itself there may be used tannin extracts and sulfited tannins. Gall nut, quebracho, sulfited quebracho, sumac, myrobalan, dividivi, chestnut bark, hemlock bark, or chestnut wood extracts, and the like give the required precipitating action. The term tannin includes both tannic acid or gallotannic acid and the strongly astringent substances which precipitate gelatin and tan hides. The amount of such extract required depends, of course, on the tannin content thereof and, as a first approximation, upon the concentration of the non-ionic agent in the waste liquors to be treated. The amount of a tannic acid added to the treating bath may vary from about 0.005% up to 1% of the bath. Only enough need be added as a minimum to permit breaking the dispersion. Grease or oil then separate. Solids flocculate and form aggregates for the most part and can be settled out, filtered off, separated by centrifuging, or removed by other methods.

The process of this invention is simple, economical and effective. It is readily adapted to different types of waste liquors.

We claim:

1. A process for resolving aqueous effluents containing matter suspended therein with the aid of a non-ionic detergent which is a water-soluble condensate of ethylene oxide and a member from the class consisting of long-chained carboxylic acids, alcohols, mercaptans, amines, and alkylphenols which comprises treating a said effluent at a pH below 7 with a tannin in an amount sufficient to counteract the suspending effect of said non-ionic detergent and permit said matter to agglomerate.

2. The process of claim 1 wherein the tannin comprises free tannic acid.

3. The process of claim 1 wherein the tannin is a sulfited tannin.

4. A process for resolving effluents containing suspended matter and a non-ionic detergent which is a water-soluble condensate of ethylene oxide and a member from the class consisting of long-chained carboxylic acids, alcohols, mercaptans, amines, and alkylphenols in an aqueous liquor which comprises adding to a said effluent a solution of a tannin in an amount sufficient to counteract the suspending effect of said non-ionic detergent and with the pH of the thus treated effluent between 6 and 3 separating said suspended matter from the aqueous liquor.

5. A process for resolving effluents containing suspended matter and a non-ionic detergent which is a water-soluble condensate of ethylene oxide and a member from the class consisting of long-chained carboxylic acids, alcohols, mercapatans, amines, and alkylphenols in an alkaline aqueous liquor which comprises adjusting the pH of a said effluent to a value of 6 to 3, adding a tannin in an amount sufficient to counteract the effect of said non-ionic detergent, and separating suspended matter and aqueous liquor.

6. A process of treating wool scouring wastes containing suspended matter including wool grease and a non-ionic detergent which is a water-soluble condensate of ethylene oxide and a member from the class consisting of long-chained carboxylic acids, alcohols, mercaptans, amines, and alkylphenols dispersed in an alkaline aqueous liquor which comprises adjusting the pH of a said waste to a value of 6 to 3, adding a tannin thereto in an amount sufficient to allow said grease to separate, and separating said grease and aqueous liquor.

7. A process of treating wool scouring wastes containing suspended matter including wool grease and a non-ionic detergent which is a water-soluble condensate of ethylene oxide and a member from the class consisting of long-chained carboxylic acids, alcohols, mercaptans, amines, and alkylphenols dispersed in an alkaline aqueous liquor which comprises adding a strong mineral acid to a said waste until the pH thereof is 6 to 3, adding thereto in an amount from about 0.005% to about 1% of the weight of said bath a tannin, whereby the suspended matter is flocculated, and separating said liquor and the flocculated suspended matter.

8. In a process for treating an aqueous effluent containing matter suspended therein in the presence of a non-ionic detergent which is a water-soluble condensate of ethylene oxide and a member from the class consisting of long-chained carboxylic acids, alcohols, mercaptans, amines, and alkylphenols, said effluent being acidic, the improvement which comprises adding to said effluent a tannic acid in an amount to counteract the suspending effect of the said non-ionic detergent.

9. A process of treating alkaline wool scouring liquors containing matter including wool grease suspended with a non-ionic detergent having a hydrophobic hydrocarbon group and a polyethoxyethanol hydrophilic group which comprises adding to said liquors a strong mineral acid until the pH of the liquors reaches a pH value between 6 and 3, adding a tannin thereto in an amount between 0.005% and 1% of the weight of said liquors and in an amount sufficient to promote flocculating said suspended matter, and separating liquor and flocculated suspended matter.

10. The process of claim 9 wherein the tannin comprises gallotannic acid.

References Cited in the file of this patent

UNITED STATES PATENTS

| 1,717,905 | Alsberg | June 18, 1929 |
| 2,220,950 | Bird | Nov. 12, 1940 |

OTHER REFERENCES

Chemical Abstracts, vol. 29 (1935), page 5920.
Webster's International Dictionary, 2nd. ed., 1940.